2,744,097
Patented May 1, 1956

2,744,097

POLYESTERS FROM β-HYDROXYALKYL DIESTERS OF SULFONYL DIBENZOIC ACID CONDENSED WITH A DIHYDROXY COMPOUND

John R. Caldwell, Kingsport, Tenn., assignor to Eastman Kodak Company, Rochester, N. Y., a corporation of New Jersey No Drawing. Application October 3, 1952, Serial No. 313,070

11 Claims. (Cl. 260—75)

This application relates to valuable linear polyesters prepared by condensing a β-hydroxyalkyl diester of p,p'-sulfonyl dibenzoic acid with one or more of various dihydroxy compounds described herein below.

It is an object of this invention to provide a process as described herein for preparing valuable linear polyesters. Other objects will become apparent hereinafter.

This application is a continuation-in-part of my copending application, Serial No. 143,594, filed February 10, 1950, now United States Patent No. 2,614,120 dated October 14, 1952. In that application sulfonyl dibenzoic acid is called bis (dicarboxy diphenyl sulfone). The polyester products described herein are also described and claimed in my copending applications filed on even date herewith, Serial No. 313,061 and Serial No. 313,067.

Highly polymeric esters of terephthalic acid and various glycols are well known and have been used in the preparation of linear, highly polymeric polyesters having properties including that of being capable of being formed into useful filaments, fibers and the like, and having high melting points and a low degree of solubility in organic solvents.

It has now been found that the β-hydroxyalkyl diesters (especially the β-hydroxyethyl diester) of p,p'-sulfonyl dibenzoic acid can be condensed with various dihydroxy compounds (as described below) to produce a new kind of linear polyester having highly valuable properties which are superior to those of the linear polyesters described in the prior art. Thus, these new linear polyesters can be prepared having a softening point above 200° C. and fibers, films, etc. of exceptional properties at high temperatures can be prepared from these new polyesters. These fibers, films, etc. have exceptionally high tensile strength and elasticity. The fibers have softening points well above 160° C. (often above 200° C.) and show excellent resistance to most organic solvents even at elevated temperatures. My new polyesters can be extruded in the form of films or sheets which are especially valuable as photographic film base material because of their excellent dimensional stability and resistance to swelling by water. These properties are further described in my copending applications referred to above.

The novel process employed in accordance with this invention is based on the fact that the β-hydroxalkyl diesters of p,p'-sulfonyl dibenzoic acid can be readily prepared as described in my parent application (Serial No. 143,594) and are especially valuable inasmuch as I have discovered that they can be readily converted into new and useful linear polyesters by heating in the presence of the dihydroxy compounds described in greater detail below. Although it is possible to employ the free p,p'-sulfonyl dibenzoic acid in the preparation of polyesters, the high degree of insolubility thereof and its slow rate of reaction, make it much more advantageous to convert the free acid into a diester thereof prior to the preparation of linear polyesters therefrom. The alkyl diesters can be prepared by refluxing the free acid with a large excess of an alkyl alcohol. Standard esterification catalysts and procedures can be employed; however, when the known catalysts of the prior art are employed in the preparation of linear polyesters from these alkyl diesters, the results have not been found by my investigations to possess the unexpectedly high degree of utility that exists when the β-hydroxyalkyl diesters are employed.

A process for preparing these β-hydroxyalkyl diesters is disclosed in my parent application whereby an alkylene oxide is reacted with the free acid in the presence of a tertiary amine catalyst. The β-hydroxyethyl diester is the diester of principal importance in preparing linear polyesters since the other β-hydroxyalkyl diesters tend to result in lower melting polyesters, especially when the diester is self-condensed or is condensed with a small proportion of additional glycol. When large proportions of additional glycol of the types described below are employed it becomes less important to exclude the other β-hydroxyalkyl diesters (particularly the β-hydroxypropyl diester) from the process of this invention since branched-chain alkylene linkages will be present in the polyester chain to a relatively small extent.

The polyester products prepared from the β-hydroxypropyl diester condensed with itself or with itself in admixture with other glycols or in the presence of a stoichiometrical excess of a glycol or glycols give products which have relatively wide softening ranges and good flow characteristics whereby they are quite valuable for the preparation of shaped objects by molding or extrusion methods. In accordance with my invention polyesters can also be prepared employing the β-hydroxyalkyl diesters in condensation with aliphatic ether glycols whereby the products have a relatively wide softening range and good flow characteristics which are quite useful in molding or extrusion operations. The softening range and flow characteristics are improved by employing mixtures of aliphatic ether glycols with other aliphatic ether glycols or polymethylene glycols.

These novel linear polyesters can be prepared so as to soften at the temperatures which are about 180°–200° or higher. Useful linear polyesters can also be prepared which soften at somewhat lower temperatures. The polyesters having melting or softening temperatures in the lower part of the overall range applicable to these polyesters are useful in the manufacture of electrical insulation, gaskets, packing, flexible tubing, rods, sheets, etc.

When the m,m' and the m,p'-isomers of p,p'-sulfonyl dibenzoic acid diesters are employed in admixture with the p,p'-isomer, the linear polyesters product has a lower melting point and softening temperature. This same effect is produced when homologs of the p,p'-isomer and the other isomers are incorporated into the linear polyester. If homologs are employed they are most advantageously those of the p,p'-isomer, e. g. m,m' dimethyl-p,p'-sulfonyl dibenzoic acid, o-ethyl-p,p'-sulfonyl dibenzoic acid, m-methyl-o-propyl-p,p'-sulfonyl dibenzoic acid, etc. Small proportions of the β-hydroxyethyl diester of such isomers and homologs can be employed in substitution for a corresponding quantity of p,p'-sulfonyl dibenzoic acid diester when the linear polyester product is not intended to be used in the preparation of fibers. In fact, when the polyester is to be employed for purposes other than making fibers, substantial quantities of these isomers and homologs can be employed if an exceptionally high melting point (e. g. over 200° C.) is not necessarily desired but a wide softening temperature range is deemed advantageous. Moreover, when the sole dihydroxy compound employed is a polymethylene glycol, useful polyesters can be prepared employing the β-hydroxyalkyl diesters of either the m,m'- or m,p'-isomers (see examples 4 and 5 below).

Two of the outstanding qualities of the polyesters of this invention are their excellent dimensional stability and low degree of water absorptivity. This results in superior resistance to dimensional change despite changes in atmospheric humidity or immersion in aqueous solutions. These qualities result in this linear polyester being well suited to the manufacture of photographic film base.

According to one embodiment of my invention, a process is provided for preparing a linear polyester comprising (A) condensing an acid diester having the following general formula:

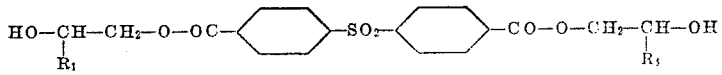

wherein $R_1$ and $R_4$ each represents a member of the group consisting of a hydrogen atom and a methyl radical, (B) with a dioxy compound selected from the group consisting of (1) a dihydroxy sulfone diester having the following general formula:

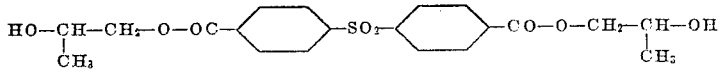

(2) an aliphatic ether glycol having the following formula:

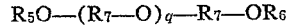

wherein $R_7$ represents an alkylene radical containing from 2 to 4 carbon atoms and $q$ represents a positive integer of from 1 to 10, $R_5$ and $R_6$ each represents a substituent selected from the group consisting of a hydrogen atom and an acyl radical containing from 2 to 4 carbon atoms and (3) a polymethylene glycol having the following formula:

wherein $p$ represents a positive integer of from 5 to 12, the dioxy compound being employed in such a proportion that there is at least an equivalent amount of oxy substituents in proportion to the carboxy substituents in the overall combination of the diesters and the dioxy compounds, (C) in the presence of a condensing agent selected from the group consisting of the alkali metals, the alkaline earth metals, the oxides of these two groups of metals, the alkoxides containing from 1 to 8 carbon atoms of these two groups of metals, the carbonates and borates of these two groups of metals, lead oxide (litharge), and compounds having the following formulas:

M(Al(OR)₄)
M(HZr(OR)₆), M'(HZr(OR)₆)₂
MH(Ti(OR)₆), M₂(Ti(OR)₆)
M'(HTi(OR)₆)₂, M'(Ti(OR)₆)
(RR'R''R''')N)₂(Ti(OR)₆)
(RR'R''R''')N)H(Ti(OR)₆)
Ti(OR)₄, PbR₄ and
RMgHal wherein M represents an alkali metal, M' represents an alkaline earth metal selected from the group consisting of magnesium, calcium and strontium, R represents an alkyl group containing from 1 to 6 carbon atoms, R', R'' and R''' each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

When the dioxy compound (or compounds) is an aliphatic ether glycol or a polymethylene glycol, it is advantageously employed in such a proportion that there are from about 1.2 to about 3 oxy substituents in proportion to the carboxy substituents in the overall combination of the acid diester and the dioxy compound. Advantageously, the elevated temperature employed during the earlier part of the condensation is from about 150° C. to about 220° C. However, higher and lower temperatures can also be employed. The upper temperature depends upon the boiling point of whatever glycol or glycols may be employed. Advantageously, the low pressure defined under (F) is less than about 15 mm. of Hg pressure. Most advantageously the pressure is less than about 5 mm. of Hg pressure. Most advantageously the dioxy compounds are aliphatic ether glycols and polymethylene glycols having formulas as depicted above wherein $R_5$ and $R_6$ represent hydrogen atoms. There is a gradual modification of properties produced by employing aliphatic ether glycols in conjunction with polymethylene glycols in increasing proportions. Advantageously the aliphatic ether glycol is used to the extent of 30 mole percent or more of the combined dioxy compounds employed when it is desired to obtain polyesters which clearly exhibit properties contributed by the aliphatic ether glycols.

The glycols defined above may not actually contain any free hydroxy radicals since they may be in esterified form as indicated by the formulas given. However, these hydroxy or substituted hydroxy radicals are referred to generically as oxy radicals or substituents. The dioxy compounds which can be employed in accordance with this invention are most advantageously dihydroxy compounds; such compounds will hereinafter be referred to as dihydroxy compounds although it is to be understood that dioxy compounds of the type described above are intended to be covered by this term. Similarly, the sulfonyl dibenzoic acid diesters defined above do not actually contain any free carboxy radicals since they are in completely esterified form; however, the

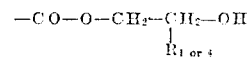

radicals are generically referred to as carboxy radicals in the description of the above process.

In the description of the process given above, the compound under (A) is called an acid diester which is the same in one instance as the first of the dihydroxy compounds described under (B) which is called a dihydroxy sulfone diester. This distinction in terminology is employed for convenience in maintaining a distinction between the two reactants employed to form the polyesters. If the acid diester is a β-hydroxyethyl diester and if it were condensed with itself, a linear polyester would be produced which melts at such a high temperature that it would decompose before a sufficiently high molecular weight could be obtained (see my copending application filed on even date herewith, Serial No. 313,061). It is therefore advantageous to condense the acid diester defined under (A) with itself only when it is the β-hydroxypropyl diester whereby a polyester can be obtained which melts at about 180° C.

When the β-hydroxyethyl diester is employed, the polymethylene glycol is restricted to those which contain from 5 to 12 carbon atoms unless a substantial quantity of one of the other dihydroxy compounds is present in order to reduce the melting point below that at which decomposition takes place, in which event a polymethylene glycol containing from 2 to 12 carbon atoms can be employed. This is discussed in greater detail in my copending application filed on even date herewith, Serial No. 313,061.

The products of this invention are linear polyesters having melting points on the order of 180°–200° C. (generally at least 160° C.) which are below the decomposition temperature of the polyester, which polyesters contain the following repeating unit:

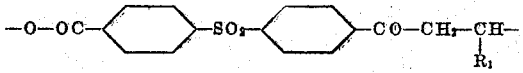

wherein $R_1$ represents a hydrogen atom or a methyl radical. If $R_1$ represents a hydrogen atom, these linear polyesters also contain a substantial proportion of either or both the following repeating units:

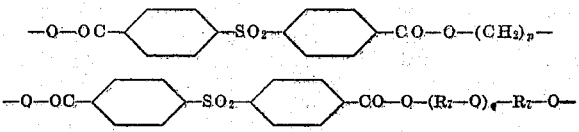

wherein $p$, $q$ and $R_7$ are defined above. These polyesters are capable of being formed into fibers (such as by melt spinning methods) especially when $R_7$ represents an ethylene radical, $q$ is 1, and $p$ is a positive integer of from 2 to 8. These fibers are capable of being drawn to from 3 to 6 times their originally spun length whereby these fibers develop strong, elastic and highly valuable properties.

Examples of the aliphatic ether glycols which can be employed advantageously in accordance with this invention include diethylene glycol, triethylene glycol, tetraethylene glycol, bis (4-hydroxybutyl) ether, and bis (3-hydroxypropyl)ether; thus $q$ in the formula set forth above is advantageously from 1 to 4 (most advantageously $q$ is 1). Other suitable aliphatic ether glycols having the following formulas can be employed in addition to those mentioned above:

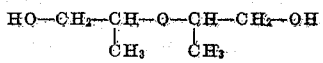

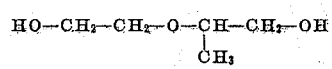

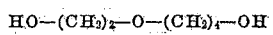

$$HO-(CH_2)_2-O-(CH_2)_x-O-(CH_2)_2-OH, et cetera$$

The ether linkages can be separated by branched chain alkyl radicals as indicated in the above formulas; however, higher melting polyesters are produced when the various atoms in the aliphatic ether glycol constitute a straight chain. When branched chain aliphatic ether glycols are employed, it is advantageous to combine such a glycol with a substantial proportion of polymethylene glycol in order to enhance the melting and softening temperatures of the polyester product. As indicated above, mono or diesters of these aliphatic ether glycols can also be employed. Thus, the acetates, propionates and butyrates are examples of such esters. Mixtures of 2 or more of these aliphatic ether glycols can also be employed.

Examples of the polymethylene glycols which can be employed in conjunction with the aliphatic ether glycols in accordance with this process of this invention include ethylene, trimethylene, pentamethylene, decamethylene and other such glycols. Note that under certain circumstances only glycols having at least 5 carbon atoms can be employed. As indicated above, mono or diesters of these glycols can also be employed. Thus, the acetates, propionates and butyrates are examples of such esters. Mixtures of two or more of these polymethylene glycols can also be employed in conjunction with one or more of the aliphatic ether glycols. Generally, the more components there are in the dihydroxy composition, the greater will be the tendency toward producing a lower melting polyester product; accordingly, it is generally most advantageous to employ no more than one aliphatic ether glycol and only one polymethylene glycol in preparing any given polyester.

The catalytic condensing agents which can be employed have been described above. From about 0.005% to about 0.2% of these catalysts based on the weight of the reactants being condensed can be employed. Higher or lower percentages can also be employed. Generally, from about 0.01 to about 0.06% of the catalytic condensing agent can be advantageously employed based on the weight of the sulfonyl dibenzoic acid diesters being condensed.

The temperature at which polyesterification can be conducted is dependent upon the specific reactants involved in any given reaction. In general, the reaction mixture can be heated at from about 150° to about 220° C. for from approximately two to three hours in an inert atmosphere (e. g. nitrogen or hydrogen); the mixture can then be heated at from about 225°–240° to about 280°–310° C. in the same atmosphere for approximately one to two hours. Finally, the pressure can be greatly reduced to form a vacuum (less than about 15 mm. of Hg pressure but preferably on the order of less than 5 mm. of Hg pressure) while the temperature is maintained in the same range (225°–310° C.); these conditions are advantageously maintained for approximately four to six additional hours. The conditions can be varied considerably depending upon the degree of polyesterification desired, the ultimate properties sought, the stability of the polyester being produced and the use for which the product is intended.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc. can be used as the reaction medium.

It has been found that the type of catalyst used has an important bearing upon the properties of the final product. Although most of the catalysts cited in the prior art can be used, it has been found that certain novel catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell Serial No. 313,072, Serial No. 313,078, Caldwell & Reynolds Serial No. 313,077, Wellman & Caldwell Serial No. 313,074, Serial No. 313,075 and Serial No. 313,076, and Wellman Serial No. 313,073 for a description of especially advantageous catalytic condensing agents.

It is important to exclude oxygen and moisture at all stages of the condensation reaction. Inert atmospheres which can be advantageously employed include nitrogen, hydrogen, helium, etc. During the process good agitation is provided. Substantially anhydrous reactants can also be advantageously employed although this is not essential especially if any water is removed in the earlier stages of the condensation.

In the examples given below, the hot bar sticking temperature is referred to in several instances. The hot bar sticking test can be briefly described as follows. The polyester fiber is placed on the flat surface of a heated bar and a weight of 100 g. is applied to the fiber along a distance of 5/8 inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results.

*Example I.—β-hydroxyethyl ester and diethylene glycol*

Three hundred and ninety-four grams (1.0 mol) of the β-hydroxyethyl ester of p,p'-sulfonyldibenzoic acid and 212 g. (2.0 mols) diethylene glycol were placed in a reaction vessel equipped with a stirrer and inlet for purified nitrogen. Magnesium chips, about 0.2 g. in weight, were heated at 100–120° C. with iodine crystals to activate the surface, and added to the reaction mixture. The mixture was heated and stirred at 190–200° C. in an atmosphere of purified nitrogen for 30 minutes. The temperature was then raised to 270–280° C. and held for 1 hour to distill off excess ethylene and diethylene glycols. A vacuum of 1.0 mm. was then applied, and stirring was continued for 4 to 5 hours. The product obtained has an inherent viscosity of 0.60 in a mixture of 60% phenol-40% tetrachlorethane. It softens at 180–200° C. The product is useful for the preparation of molded objects. It can be extruded in the form of rods, sheets, films, and tubes. The polymer contains essentially 50 mol percent each of ethylene glycol and diethylene glycol.

*Example II.—β-hydroxyethyl diester and decamethylene glycol*

Three hundred and ninety-four grams (1.0 mol) of the β-hydroxyethyl ester of p,p'-sulfonyldibenzoic acid and 261 g. (1.5 mol) of decamethylene glycol were placed in a reaction vessel equipped with a stirrer, a distillation column, and an inlet for purified hydrogen. Magnesium chips (0.2 g.) were heated with iodine to activate the surface and added to the vessel. A solution of 0.1 g. lithium in 10 cc. ethyl alcohol was added. The mixture was stirred at 180–190° C. for 30 minutes in an atmosphere of purified hydrogen and the temperature was then raised to 250–260° C. The distillation column was adjusted so that ethylene glycol was removed but with the decamethylene glycol being returned to the reaction mixture. After substantially all of the ethylene glycol had been distilled, a vacuum of 1–2 mm. was applied. Stirring was continued for 5–6 hours. A polyester having an inherent viscosity of 0.7 in 60 phenol-40 tetrachlorethane was obtained. This product is substantially pure decamethylene glycol polymer and contains very little ethylene glycol. The polyester melts at about 200° C. It is useful for the manufacture of fibers, films, and molded objects.

*Example III.—β-hydroxyethyl diester and octamethylene glycol*

The procedure described in Example II was repeated exactly except that an equimolecular quantity of octamethylene glycol was employed in lieu of the 1.5 mol of decamethylene glycol, there being a suitable adjustment in the distillation operation to retain the octamethylene glycol while distilling off ethylene glycol. The polyester obtained was substantially a pure polyester containing only octamethylene radicals in the repeating units. This polyester melts at about 210°–215° C.

*Example IV.—β-hydroxyethyl diester condensed with same diester of m,m'-isomer of the acid*

Two mols of m,m'-sulfonyldibenzoic acid β-hydroxyethyl ester and 1 mol of p,p'-sulfonyldibenzoic acid β-hydroxyethyl ester were heated with magnesium catalyst, 0.2 gram, activated by heating with iodine. The equipment employed was the same as in Example I. An inert atmosphere of purified nitrogen was employed. The reaction mixture was heated at about 225° C. with stirring while ethylene glycol distilled off. The temperature was then raised to 260°–275° C. over a period of two hours and held in this range for another hour. The pressure was then reduced to about 0.8–1.0 mm. of Hg pressure and heating was continued for five more hours. The polyester obtained is useful as a molding plastic and for preparing films.

*Example V.—β-hydroxyethyl diester of m,p'-isomer of acid self-condensed*

Three hundred and ninety-four grams (1.0 mol) of m,p'-sulfonyldibenzoic acid β-hydroxyethyl ester were placed in a reaction vessel equipped with a stirrer. Magnesium turnings (0.2 g.) activated by heating with iodine were added as catalyst. The vessel was heated at 220–230° C. and the stirrer was started. An inert atmosphere of purified nitrogen was employed. Ethylene glycol began to distill as the ester interchange took place. The temperature was raised to 260–270° C. during 2 hours and held at this temperature for 1 hour. A vacuum of 1 mm. was applied for 5 hours. The product obtained is useful as a molding plastic.

*Example VI.—β-hydroxyethyl diester and hexamethylene glycol*

The procedure described in Examples II and III was repeated exactly except that an equimolecular quantity of hexamethylene glycol was employed. The polyester obtained melts at about 220° C. and is useful in preparing fibers, films, etc.

*Example VII.—β-hydroxyethyl diester, diethylene glycol and tetramethylene glycol*

The procedure described in Example I was repeated exactly except that half of the 2 mols diethylene glycol was replaced with 1 mol of tetramethylene glycol. The polyester product obtained contains repeating units consisting of approximately 50% (mole basis) of units containing the ethylene radical, 25% containing the diethylene radical and 25% containing the tetramethylene radical. This polyester had properties similar to the product obtained in Example I except for a higher softening temperature. This product can be used to form fibers, tubes, films, etc.

*Example VIII.—β-hydroxyethyl diester, tetraethylene glycol and trimethylene glycol*

The procedure described in Example I was repeated exactly except that in lieu of the 2 mols of diethylene glycol there was employed 1 mole of tetraethylene glycol and 1 mole of trimethylene glycol. The polyester obtained has properties similar to those described for the product of Example I. The product has a relatively wide softening range and is useful in extruding and molding shaped objects, e. g. tubes, rods, sheets, balls, etc. The polymer contains repeating units containing ethylene, tetraethylene and trimethylene radicals.

The procedure described in Examples II, III and VI can be employed to prepare polyesters from aliphatic ether glycols which contain no substantial amount of ethylene radicals in the repeating units.

In addition to the catalysts employed in the above examples, other of the described catalysts can also be employed, e. g. Ca, Li₂CO₃, K₂BO₃, and litharge.

What I claim is:

1. A process for preparing a linear polyester comprising (A) condensing an acid diester having the following general formula:

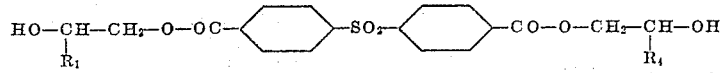

wherein $R_1$ and $R_4$ each represents a member of the group consisting of a hydrogen atom and a methyl radical, (B) with a dioxy compound selected from the group consisting of (1) a dihydroxy sulfone diester having the following general formula:

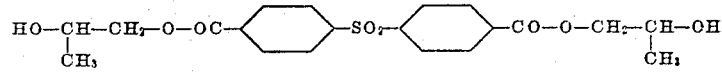

(2) an aliphatic ether glycol having the following formula:

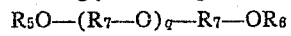

wherein $R_7$ represents an alkylene radical containing from 2 to 4 carbon atoms and $q$ represents a positive integer of from 1 to 10, and $R_5$ and $R_6$ each represents a substituent selected from the group consisting of a hydrogen atom and an acyl radical containing from 2 to 4 carbon atoms and (3) a polymethylene glycol having the following formula:

$$R_5O\text{---}(CH_2)_p\text{---}OR_6$$

wherein $p$ represents a positive integer of from 5 to 12, the dioxy compound being employed in such a proportion that there is at least an equivalent amount of oxy substituents in proportion to the carboxy substituents in the overall combination of the diesters and the dioxy compounds, (C) in the presence of a condensing agent selected from the group consisting of the alkali metals, the alkaline earth metals, the oxides of these two groups of metals, the alkoxides containing from 1 to 8 carbon atoms of these two groups of metals, the carbonates and borates of these two groups of metals, and litharge, (D) at an elevated temperature, (E) the condensation being conducted in an inert atmosphere, and (F) the latter part of the condensation being conducted at a very low pressure of the inert atmosphere.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.2% based on the weight of the diesters employed.

4. A process as defined in claim 3 wherein the elevated temperature employed during the earlier part of the condensation is from about 150° to about 220° C. and the low pressure defined under (F) is less than about 15 mm. of Hg pressure.

5. A process as defined in claim 4 wherein all materials employed in the process are substantially anhydrous.

6. A process as defined in claim 5 wherein the dioxy compound is employed in such a proportion when it is a glycol that there are from about 1.2 to about 3 oxy substituents in proportion to the carboxy substituents in the overall combination of the acid diester and the glycol.

7. A process as defined in claim 6 wherein the acid diester is the β-hydroxyethyl diester of p,p'-sulfonyl dibenzoic acid and the dioxy compound is diethylene glycol.

8. A process as defined in claim 6 wherein the acid diester is the β-hydroxyethyl diester of p,p'-sulfonyl dibenzoic acid and the dioxy compound is decamethylene glycol.

9. A process as defined in claim 6 wherein the acid diester is the β-hydroxyethyl diester of p,p'-sulfonyl dibenzoic acid and the dioxy compound is octamethylene glycol.

10. A process as defined in claim 6 wherein the acid diester is the β-hydroxyethyl diester of p,p'-sulfonyl dibenzoic acid and the dioxy compound is hexamethylene glycol.

11. A process as defined in claim 6 wherein the acid diester is the β-hydroxyethyl diester of p,p'-sulfonyl dibenzoic acid and the dioxy compound is an equimolecular mixture of diethylene glycol and tetramethylene glycol.

References Cited in the file of this patent

UNITED STATES PATENTS

| | | |
|---|---|---|
| 2,465,319 | Whinfield et al. | Mar. 22, 1949 |
| 2,547,113 | Drewitt et al. | Apr. 3, 1951 |

FOREIGN PATENTS

| | | |
|---|---|---|
| 621,977 | Great Britain | Apr. 25, 1949 |
| 650,358 | Great Britain | Feb. 21, 1951 |